United States Patent
Furukawa et al.

(10) Patent No.: US 9,481,267 B2
(45) Date of Patent: Nov. 1, 2016

(54) VEHICLE SEAT

(71) Applicant: TOYOTA BOSHOKU KABUSHIKI KAISHA, Aichi-ken (JP)

(72) Inventors: Kenji Furukawa, Aichi-ken (JP); Yoshiyuki Kumazaki, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 142 days.

(21) Appl. No.: 14/070,744

(22) Filed: Nov. 4, 2013

(65) Prior Publication Data
US 2014/0125106 A1 May 8, 2014

(30) Foreign Application Priority Data
Nov. 5, 2012 (JP) ................................. 2012-243674

(51) Int. Cl.
*B60N 2/20* (2006.01)

(52) U.S. Cl.
CPC ...................... *B60N 2/20* (2013.01)

(58) Field of Classification Search
CPC ....................................................... B60N 2/20
USPC ..................................................... 297/378.1
See application file for complete search history.

(56) References Cited

U.S. PATENT DOCUMENTS

| | | | | |
|---|---|---|---|---|
| 5,803,546 A * | 9/1998 | Yamazaki | ................. | A47C 7/60 297/331 |
| 7,775,591 B2 * | 8/2010 | Hahn | ....................... | B60N 2/12 297/341 |
| 8,348,346 B2 * | 1/2013 | Li | ............................ | B60N 2/20 297/378.1 X |
| 8,899,679 B2 * | 12/2014 | Edwards | .............. | B60N 2/3013 297/292 |
| 2006/0033372 A1 * | 2/2006 | Lee | ........................ | B60N 2/22 297/378.1 |

FOREIGN PATENT DOCUMENTS

| | | |
|---|---|---|
| JP | 63-142140 | 9/1988 |
| JP | 2008-272130 | 11/2008 |
| JP | 2008-295695 | 12/2008 |
| JP | 2012-017051 | 1/2012 |

OTHER PUBLICATIONS

Official Action, along with partial English-language translation thereof, for JP 2012-243674 having a mailing date of Mar. 8, 2016.

* cited by examiner

*Primary Examiner* — Anthony D Barfield
(74) *Attorney, Agent, or Firm* — Greenblum & Bernstein, P.L.C.

(57) ABSTRACT

A vehicle seat includes a reclining mechanism that is provided to make the angle of a seat back relative to a seat cushion adjustable; a biasing member that biases the seat back in such a direction as to decrease the angle of the seat back relative to the seat cushion; and an assist member that applies a force in a direction opposite to the biasing force of the biasing member to the seat back, and generates a force that is smaller than the total of the weight of the seat back and the biasing force of the biasing member when the seat back is lifted up from a forwardly folded position in which the seat back has a small angle relative to the seat cushion toward a sitting position.

2 Claims, 7 Drawing Sheets

F I G . 5
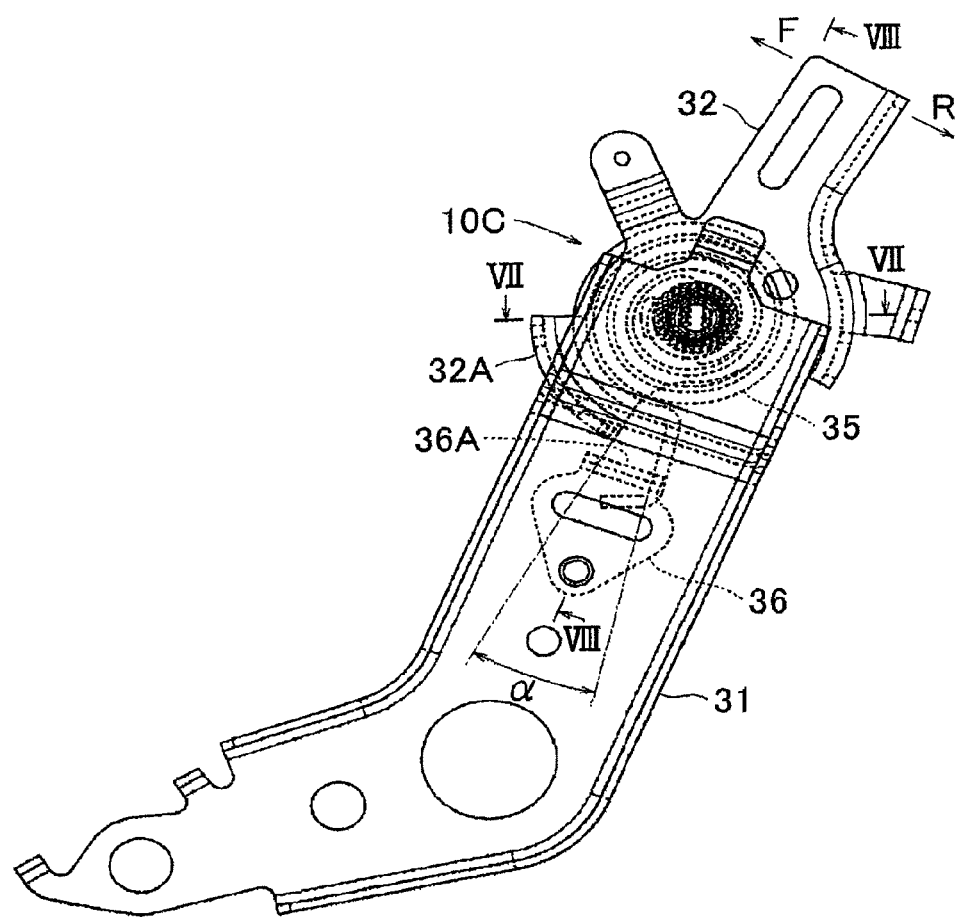

F I G . 7
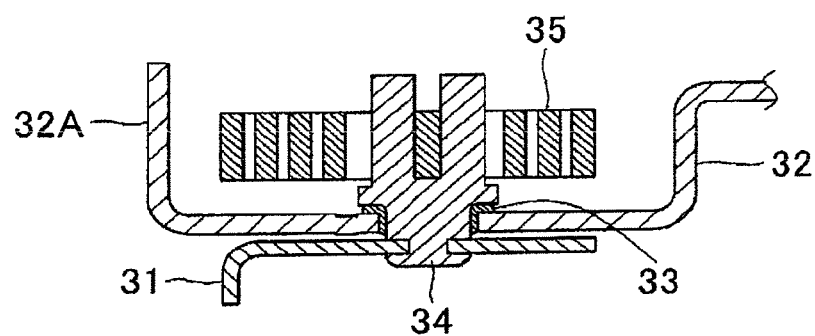
F I G . 8
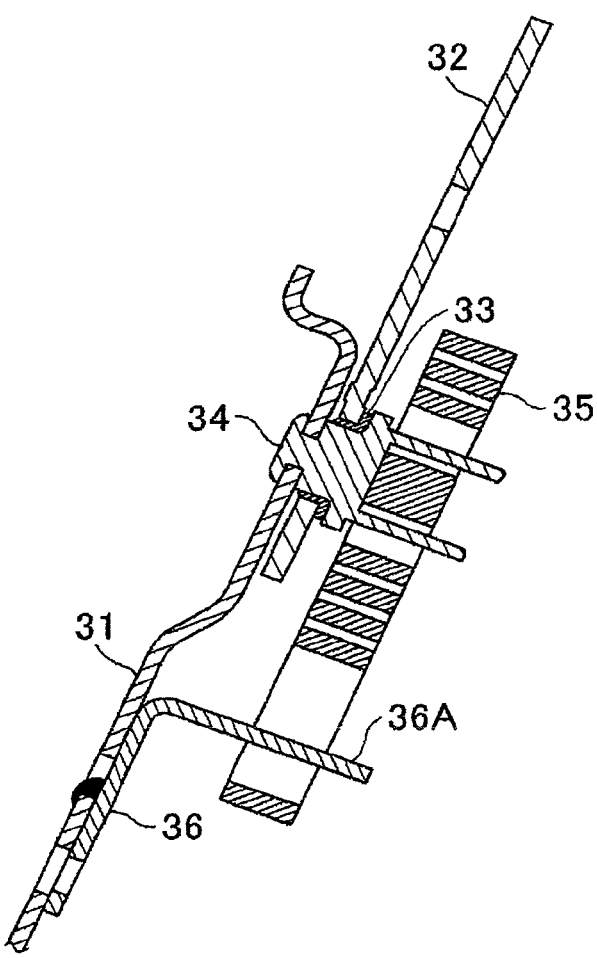

VEHICLE SEAT

INCORPORATION BY REFERENCE

The disclosure of Japanese Patent Application No. 2012-243674 filed on Nov. 5, 2012 including the specification, drawings and abstract is incorporated herein by reference in its entirety.

BACKGROUND OF THE INVENTION

1. Field of the Invention

The present invention relates to a vehicle seat which is equipped with a reclining mechanism that makes the angle of the seat back relative to the seat cushion adjustable and a biasing member that biases the seat back in such a direction as to decrease the angle of the seat back relative to the seat cushion.

2. Description of Related Art

Modes of use of a vehicle seat as described above include what is called a tilt-down seat and a fold-down seat. In the case of such a seat, the seat back is folded down on the seat cushion. At this time, a spring force is being applied to the seat back by a biasing member. Japanese Patent Application Publication No. 2012-17051 (JP 2012-17051 A) discloses a framework structure for a vehicle seat that is used as a tilt-down seat or fold-down seat.

SUMMARY OF THE INVENTION

In the case of a tilt-down seat or fold-down seat, the problem is that a large operation load must be applied when the seat back is lifted up from the folded position on the seat cushion toward a sitting position because an operating force that exceeds the total of the weight of the seat back and the spring force is required. The present invention reduces the operation load necessary to lift up the seat back from the folded position on the seat cushion by applying an assist force in a direction in which the seat back is lifted up.

According to a first embodiment of the present invention, a vehicle seat which includes a reclining mechanism that is provided to make the angle of a seat back relative to a seat cushion adjustable; and a biasing member that biases the seat back in such a direction as to decrease the angle of the seat back relative to the seat cushion, further includes an assist member that applies a force in a direction opposite to the biasing force of the biasing member to the seat back and generates a force that is smaller than the total of the weight of the seat back and the biasing force of the biasing member when the seat back is lifted up from a forwardly folded position in which the seat back has a small angle relative to the seat cushion toward a sitting position. According to the first embodiment, because the assist member, which applies a force to the seat back in a direction opposite to the biasing force of the biasing member, is provided, the operation load necessary to lift up the seat back from the forwardly folded position toward a sitting position can be reduced. The assist force that is applied by the assist member is set to be smaller than the total of the weight of the seat back in the forwardly folded position and the biasing force that is applied by the biasing member. Thus, the seat back is not lifter up from the forwardly folded position by the assist force without any operation. Thus, when the seat back is forwardly folded, the seat back can be held in the position stably.

In the first embodiment, the vehicle seat may further include a hinge portion of the seat back that is provided with the reclining mechanism and the biasing member, and another hinge portion of the seat back that is arranged in line with the hinge portion and provided with the assist member. The vehicle seat of the first embodiment may further include an assist force cancelling mechanism that limits the range in which the assist member applies the assist force to the seat back so that the assist force is applied only until the seat back is lifted up by a prescribed angle from the forwardly folded position toward a sitting position. A biasing force is applied to the hinge portion that is provided with the reclining mechanism by the biasing member in such a direction as to fold the seat back forward, and an assist force is applied to the other hinge portion by the assist member in such a direction as to lift up the seat back from the forwardly folded position toward a sitting position. Thus, if these forces are applied simultaneously, the framework of the seat back receives a twisting force from the hinge portions that are arranged in line with each other. However, according to the above configuration, the range in which the assist force is applied by the assist member is limited by the assist force cancelling mechanism so that the assist force can be applied only until the seat back is lifted up by a prescribed angle from the forwardly folded position toward a sitting position. Thus, the range in which the seat back receives a twisting force can be narrowed.

In the above configuration, the seat back may have a pair of hinge portions each of which is provided with the reclining mechanism and the biasing member, and the other hinge portion of the seat back may be arranged adjacent to and in line with one of the paired hinge portions and provided with the assist member. In addition, the prescribed angle of the assist force cancelling mechanism may be set in a range in which the angle of the seat back relative to the seat cushion is smaller than a locking operation range of the reclining mechanisms. When the seat back has a pair of hinge portions each of which is provided with a reclining mechanism and a biasing member, and the other hinge portion of the seat back is arranged adjacent to and in line with one of the paired hinge portions, and is provided with the assist member, there is a possibility that the seat back, which includes the paired hinge portions, may be twisted and the paired reclining mechanisms may be locked at different angles because the effect of the assist force is greater on one of the paired hinge portions than on the other if the biasing forces of the biasing members and the assist force of the assist member are simultaneously applied to the seat back. According to the above configuration, however, because assist force cancelling mechanism prevents the assist member from applying the assist force to the seat back when the reclining mechanisms are in their locking operation range, the seat back is not twisted based on the assist force and the paired reclining mechanisms can be prevented from being locked at different angles because of the twist of the seat back when the reclining mechanisms are in their locking operation range.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 5 is a side view of the structure that is shown in FIG. 4;

FIG. 7 is a cross-sectional view taken along the line VII-VII of FIG. 5; and

FIG. 8 is a cross-sectional view taken along the line VIII-VIII of FIG. 5.

DETAILED DESCRIPTION OF EMBODIMENTS

Figure 1:
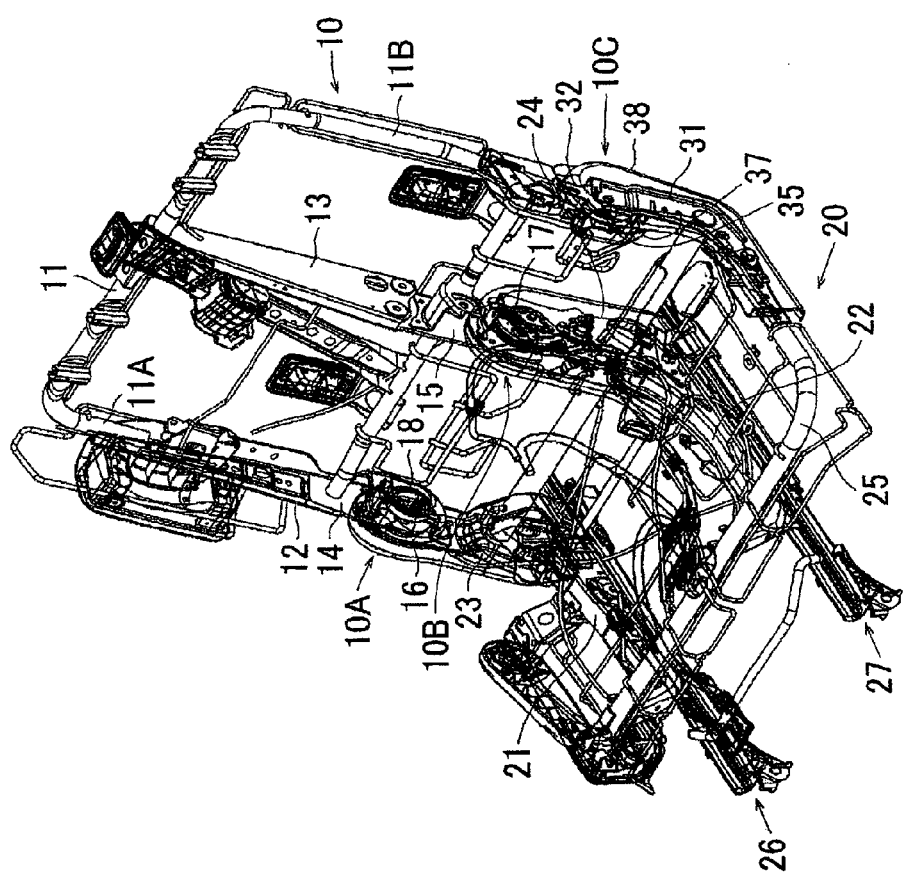
FIG. 1 is a perspective view of an essential part of one embodiment of the present invention.
Figure 2:
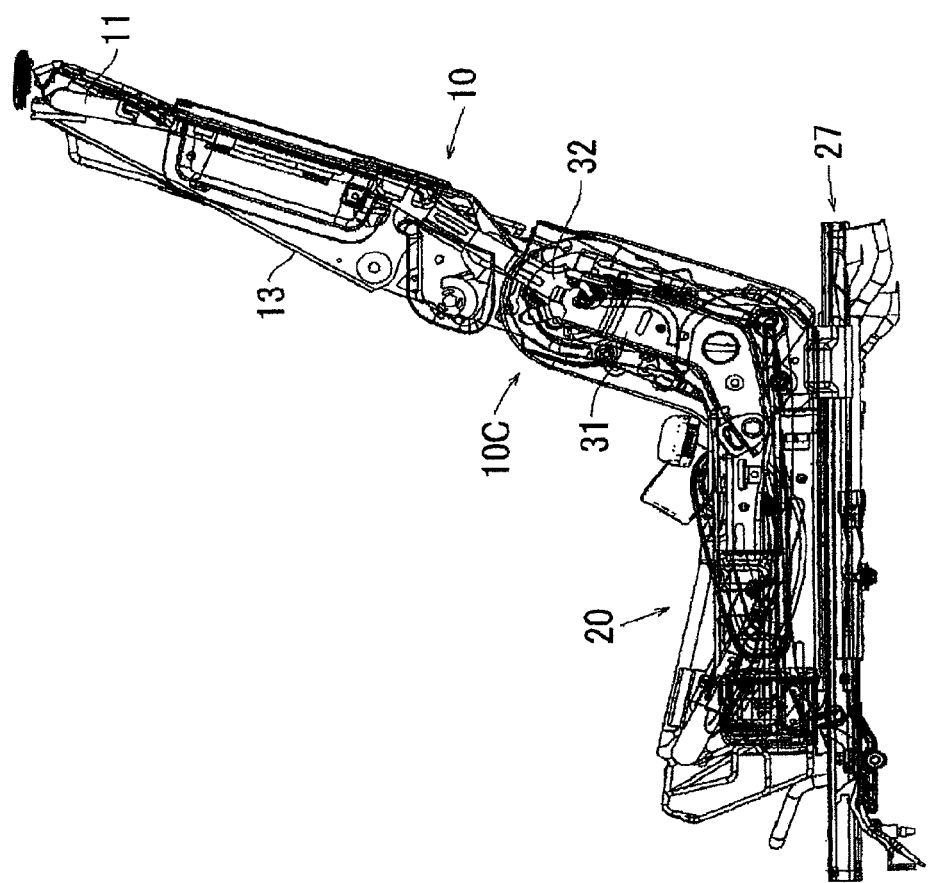
FIG. 2 is a side view of the embodiment that is shown in FIG. 1.
Figure 3:
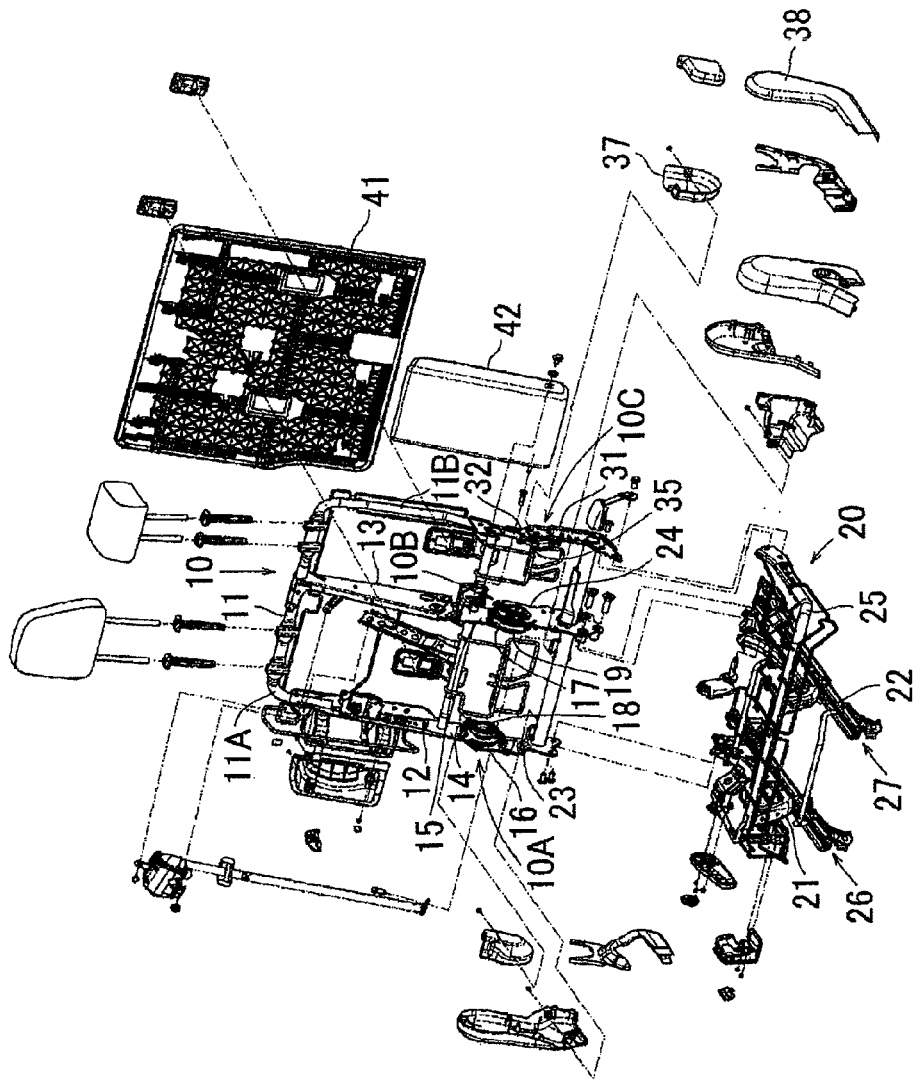
FIG. 3 is an exploded perspective view of the essential part of the above embodiment.
Figure 4:
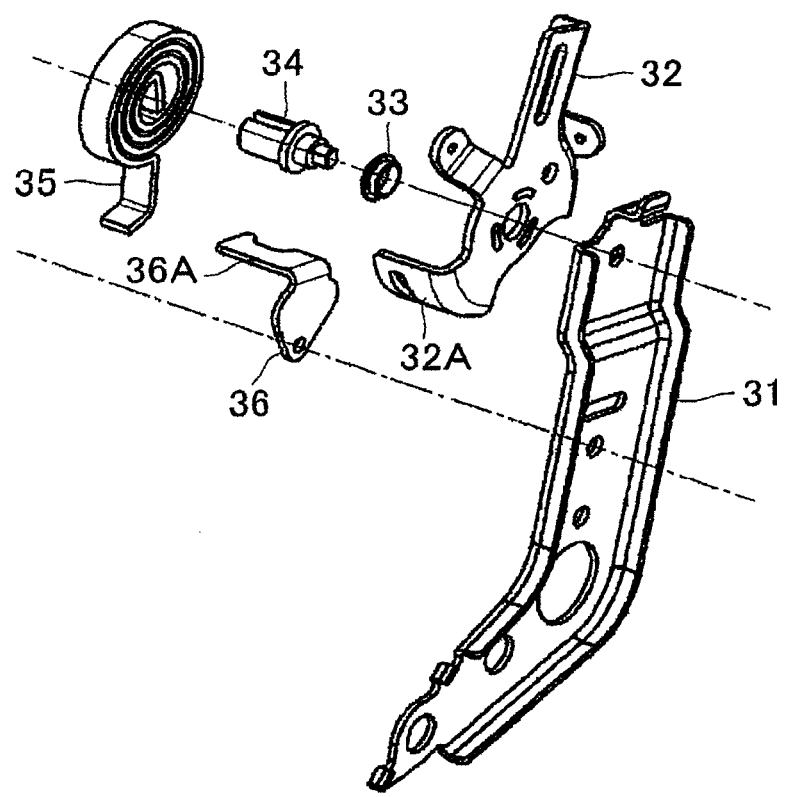
FIG. 4 is an enlarged exploded perspective view that illustrates an assist member and an assist force cancelling mechanism of the above embodiment.
Figure 6:
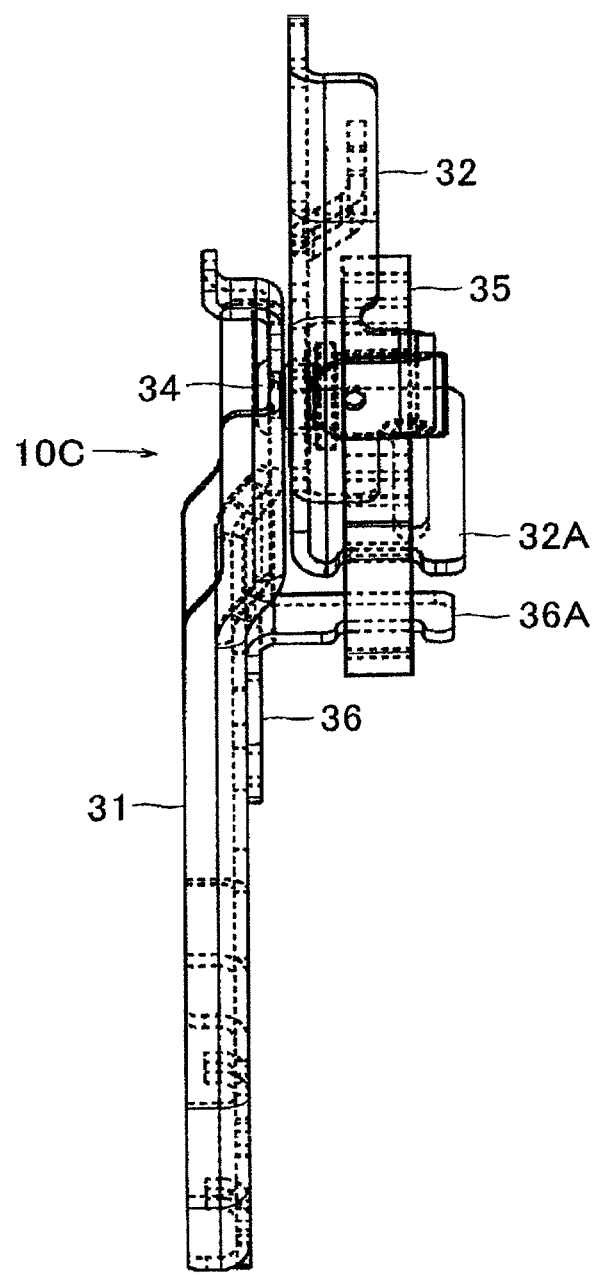
FIG. 6 is a rear view of the structure that is shown in FIG. 4.

FIGS. 1 to 3 show one embodiment of the present invention, and this embodiment generally relates to a larger seat of a 6:4 division seat that is applied to the second row seat of a hatchback type vehicle. Because the larger seat is located on the right side in the second-row seat, the larger seat is hereinafter referred to as "right side seat" in this embodiment. It should be noted that only the framework of the seat is shown and the cushion pad and upholstery that are wrapped over the framework are not shown in FIGS. 1 to 3. A seat back 10 is configured to be rotatable about hinge portions 10A to 10C so that its angle can be adjusted relative to a seat cushion 20. The hinge portions 10A and 10B incorporates (is provided with) reclining mechanisms 16 and 17, respectively, and springs 18 and 19 (which function as biasing members of the present invention), respectively. Specifically, the hinge portions 10A and 10B incorporate back hinges 14 and 15, respectively, and cushion hinges 23 and 24, respectively. The reclining mechanism 16 is located between the back hinge 14 and the cushion hinge 23, and the reclining mechanism 17 is located between the back hinge 15 and the cushion hinge 24. The angle of the seat back 10 relative to the seat cushion 20 is adjusted via the back hinges 14 and 15 and the cushion hinges 23 and 24 by changing the lock angle of the reclining mechanisms 16 and 17. The springs 18 and 19 are spiral springs. The inner ends of the spiral springs are coupled to the cushion hinges 23 and 24, respectively, and the outer ends of the spiral springs are coupled to the back hinges 14 and 15, respectively. The spiral springs bias the seat back 10 in such a direction as to decrease the angle of the seat back 10 relative to the seat cushion 20. The reclining mechanisms 16 and 17 are configured to be unlocked synchronously by operating one unlock lever (not shown).

The seat back 10 has a framework which includes a generally gate-shaped pipe frame 11 that has a first end 11A to which a plate frame 12 is secured by welding and a second end 11B to which a back hinge 32 of the hinge portion 10C is secured by welding, and a plate frame 13 that is secured by welding to the pipe frame 11 between the first end 11A and the second end 11B. Each of the plate frames 12 and 13 is formed by bending a metal plate. The other end of the plate frame 12 is secured by welding to the back hinge 14, and the other end of the plate frame 13 is secured by welding to the back hinge 15. The other ends of the cushion hinges 23 and 24 are secured by welding to cushion frames 21 and 22, respectively. A cushion hinge 31 is coupled by a hinge to the back hinge 32, and the other end of the cushion hinge 31 is secured by welding to a pipe frame 25 to constitute the seat cushion 20. The other end of the pipe frame 25 is bent at a right angle in a front part of the seat cushion 20. The tip of the pipe frame 25 is secured to an upper part of the cushion frame 21 and an intermediate portion of the pipe frame 25 is secured to an upper part of the cushion frame 22. The cushion frames 21 and 22 are secured at their lower end portions to the vehicle floor (not shown) via slide mechanisms 26 and 27, respectively. Thus, the seat cushion 20 is slidable back and forth along the slide mechanisms 26 and 27.

FIGS. 4 to 8 illustrate the hinge portion 10C on an enlarged scale. A spacer 33 and a pin 34 are sequentially fitted in an opening that is formed generally at the center of the back hinge 32. The tip of the pin 34, which protrudes from the back hinge 32, is additionally inserted in an opening of the cushion hinge 31 and swaged. Thus, the back hinge 32 is coupled to the cushion hinge 31 rotatably about the spacer 33 and the pin 34. The pin 34 has a split pin structure, and the inner end of an assist spring 35, which is a spiral spring, is fitted in the slit at the tip of the pin 34. The outer end of the assist spring 35 is engageable with an arm portion 32A of the back hinge 32. Thus, the back hinge 32 is configured to be able to be rotated about the pin 34 relative to the cushion hinge 31 by the biasing force (assist force) of the assist spring 35. A spring support 36 is secured by welding to the cushion hinge 31 at a location adjacent to the back hinge 32, and an arm portion 36A of the spring support 36 is located adjacent to the arm portion 32A of the back hinge 32. Thus, the outer end of the assist spring 35, which is engageable with the arm portion 32A of the back hinge 32, is also engageable with the arm portion 36A of the spring support 36. Therefore, the range in which the biasing force of the assist spring 35 is applied to the back hinge 32 is limited at the point where the outer end of the assist spring 35 is engaged with the arm portion 36A of the spring support 36. The spring support 36 functions as an assist force cancelling mechanism of the present invention.

Because the seat is constituted as described above, when the unlock lever for the reclining mechanisms 16 and 17 is operated with the seat back 10 in a sitting position as shown in FIG. 1, the reclining mechanisms 16 and 17 are unlocked and the seat back 10 is folded forward by the biasing forces of the springs 18 and 19 in such a manner that the angle of the seat back 10 relative to the seat cushion 20 is decreased. As a result, the seat back 10 is folded down on the seat cushion 20. At this time, because the back hinge 32 of the hinge portion 10C is also rotated in the direction of arrow F in FIG. 5 together with the seat back 10, the spiral spring, which constitutes the assist spring 35, is wound up tight by the arm portion 32A of the back hinge 32 and generates an assist force in such a direction as to lift up the seat back 10. Thus, when the seat back 10 is lifted up from the folded position on the seat cushion 20 toward a sitting position, the seat back 10 can be operated with a small force because an assist force is applied by the assist spring 35 and an operational force equivalent to the assist force is unnecessary. Otherwise, an operational force that exceeds the total of the weight of the seat back 10 and the biasing forces of the springs 18 and 19 would be required. The assist force of the assist spring 35 is adjusted to generate a force that is smaller than the total of the weight of the seat back 10 and the biasing forces of the springs 18 and 19 with the seat back 10 folded down on the seat cushion 20. This adjustment is made to such a degree that the seat back 10 can be stably held in the folded position on the seat cushion 20 and the seat back 10 can be easily lifted up from the folded position on the seat cushion 20 toward a sitting position even by a child with weak force. According to the above embodiment, because the assist spring 35, which applies a force to the seat back 10 in a direction opposite to the biasing forces of the springs 18 and 19, is provided, the operation load necessary to lift up the seat back 10 from the forwardly folded position on the seat cushion 20 toward a sitting position can be reduced.

As described above, biasing forces are applied by the springs 18 and 19 to the hinge portions 10A and 10B, respectively, which incorporate the reclining mechanisms 16 and 17, respectively, in such a direction as to fold the seat back 10 forward, and an assist force is applied by the assist spring 35 to the other hinge portion 10C in such a direction as to lift up the seat back 10 from the forwardly folded position toward a sitting position. Thus, if these forces are applied simultaneously, the pipe frame 11, the plate frames 12 and 13 and the back hinges 14, 15 and 32, which constitute the framework of the seat back 10, receive a twisting force from the hinge portions 10A to 10C, which are arranged in line with each other. However, according to the above embodiment, because the outer end of the assist spring 35 is engaged with the arm portion 36A of the spring support 36, the range in which the assist force of the assist spring 35 is applied to the seat back 10 is limited so that the assist force can be applied only until the seat back 10 is lifted up by a prescribed angle from the forwardly folded position toward a sitting position. Thus, the range in which the seat back 10 receives a twisting force can be narrowed.

FIG. 5 shows the position where the back hinge 32 is located when the reclining mechanisms 16 and 17 are first locked when the seat back 10 is lifted up from the forwardly folded position toward a sitting position. A prescribed angular range in which the back hinge 32 is rotated from this position in the direction of arrow R in FIG. 5 (in such a direction as to fold the seat back 10 backward) is the locking operation range of the reclining mechanisms 16 and 17 (the range in which the reclining mechanisms 16 and 17 can be locked in an arbitrary angular position to adjust the angle of the seat back 10 relative to the seat cushion 20). In this range, the outer end of the assist spring 35 is engaged with the arm portion 36A of the spring support 36 as shown in FIG. 5 and therefore the assist force of the assist spring 35 is not applied to the back hinge 32. In other words, the outer end of the assist spring 35 is brought into engagement with the arm portion 32A of the back hinge 32 when the back hinge 32 is folded forward in the direction of arrow F by an angle α from the position that is shown in FIG. 5, and the engagement between the outer end of the assist spring 35 and the arm portion 36A of the spring support 36 is released and the assist force of the assist spring 35 is therefore applied to the back hinge 32 when the back hinge 32 is folded further forward from the above position. In other words, the angular position beyond which the assist force of the assist spring 35 is not applied to the back hinge 32 because the outer end of the assist spring 35 is engaged with the arm portion 36A of the spring support 36 is set in a range in which the angle of the seat back 10 relative to the seat cushion 20 is smaller than the locking operation range of the reclining mechanisms 16 and 17. When a pair of hinge portions 10A and 10B incorporate reclining mechanisms 16 and 17, respectively, and springs 18 and 19, respectively, and another hinge portion 10C that is located adjacent to and in line with the hinge portion 10B incorporates an assist spring 35 as in the above embodiment, there is a possibility that the pipe frame 11, the plate frames 12 and 13 and the back hinges 14, 15 and 32, which constitute the framework of the seat back 10, may be twisted and the paired reclining mechanisms 16 and 17 may be locked at different angles because the effect of the assist force is greater on the hinge portion 10B than on the hinge portion 10A if the biasing forces of the springs 18 and 19 and the assist force of the assist spring 35 are simultaneously applied to the seat back 10. However, because the assist force of the assist spring 35 is not applied to the seat back 10 when the reclining mechanisms 16 and 17 are in the locking operation range as described above, the seat back 10 is not twisted based on the assist force and the paired reclining mechanisms 16 and 17 can be prevented from being locked at different angles because of the twist of the seat back 10 when the reclining mechanisms 16 and 17 are in the locking operation range.

In FIG. 3, reference numeral 41 indicates a back board, which is secured to the back side of the seat back 10 as is well known. Reference numeral 42 indicates an armrest for the seat occupant, which can be stored in a space between the plate frame 13 and the second end 11B of the pipe frame 11 when not in use and is projected forward from the seat back 10 when in use. Reference numerals 37 and 38 indicate shields. The shield 37 is secured to the back hinge 32 to cover the assist spring 35 within the seat back 10 so that the assist spring 35 cannot interfere with the surrounding parts. The shield 38 covers one side of the cushion hinge 31 to improve its appearance as shown in FIG. 1. In FIG. 1, the shield 38 is shown as if it were transparent. While various components that are not described in the foregoing are also shown in FIGS. 1 to 3, their description is omitted because they have no direct relationship with the present invention.

While a specific embodiment has been described in the foregoing, the present invention is not limited to the appearance and configuration thereof, and various modifications, additions and omissions may be made without departing from the gist of the present invention. For example, the following changes may be made.

1. The biasing members and the assist member are not limited to the springs as shown in the above embodiment, and different types of elastic bodies, such as gas dampers or oil dampers, may be used.

2. While a case where the present invention is applied to the right side seat of a 6:4 division seat is shown in the above embodiment, the present invention may be applied to the left side seat of a 6:4 division seat or a common separate-type seat for single use. Alternatively, the present invention may be applied to a bench type seat for three people. When the present invention is applied to the left side seat or a separate type seat, because the seat back usually has two hinge portions, a reclining mechanism and a biasing member are incorporated in one of the hinge portions and assist means is incorporated in the other hinge portion. When the present invention is applied to a bench-type seat, because the seat back usually has three or more hinge portions, the reclining mechanisms and the biasing members are incorporated in the outermost hinge portions and the assist member is incorporated in a hinge portion that is located between the outermost hinge portions.

3. While the biasing members are incorporated in the hinge portions that incorporate the reclining mechanisms and the assist member is incorporated in another hinge portion that is arranged in line with the hinge portions that incorporate the reclining mechanism in the above embodiment, the biasing members and the assist member may be placed in any location as long as a biasing force and an assist force can be applied to the seat back.

What is claimed is:
1. A vehicle seat comprising:
a reclining mechanism that is provided to make an angle of a seat back relative to a seat cushion adjustable;

a biasing member that biases the seat back in such a direction as to decrease the angle of the seat back relative to the seat cushion;

an assist member that applies a force in a direction opposite to a biasing force of the biasing member to the seat back, and generates a force that is smaller than a total of a weight of the seat back and the biasing force of the biasing member when the seat back is lifted up from a forwardly folded position in which the seat back has a small angle relative to the seat cushion toward a sitting position;

a hinge portion of the seat back that is provided with the reclining mechanism and the biasing member;

another hinge portion of the seat back that is arranged in line with the hinge portion and provided with the assist member; and an assist force cancelling mechanism that limits a range in which the assist member applies the assist force to the seat back so that the assist force is applied only until the seat back is lifted up by a prescribed angle from the forwardly folded position toward the sitting position.

2. The vehicle seat according to claim 1, wherein the seat back has a pair of hinge portions each of which is provided with the reclining mechanism and the biasing member, and the other hinge portion of the seat back is arranged adjacent to and in line with one of the paired hinge portions, and is provided with the assist member, and wherein the prescribed angle of the assist force cancelling mechanism is set in a range in which the angle of the seat back relative to the seat cushion is smaller than a locking operation range of the reclining mechanism.

* * * * *